(12) United States Patent
Meng

(10) Patent No.: US 10,939,240 B2
(45) Date of Patent: Mar. 2, 2021

(54) LOCATION INFORMATION PROCESSING METHOD AND APPARATUS, STORAGE MEDIUM AND PROCESSOR

(71) Applicant: TENCENT TECHNOLOGY (SHENZHEN) COMPANY LIMITED, Shenzhen (CN)

(72) Inventor: Qingchun Meng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/456,051

(22) Filed: Jun. 28, 2019

(65) Prior Publication Data

US 2019/0320294 A1 Oct. 17, 2019

Related U.S. Application Data

(63) Continuation of application No. PCT/CN2018/082699, filed on Apr. 11, 2018.

(30) Foreign Application Priority Data

Apr. 11, 2017 (CN) .......................... 201710233235.9

(51) Int. Cl.
*G08G 1/01* (2006.01)
*H04W 4/02* (2018.01)
*H04W 4/029* (2018.01)

(52) U.S. Cl.
CPC ............ *H04W 4/029* (2018.02); *G08G 1/012* (2013.01); *H04W 4/027* (2013.01)

(58) Field of Classification Search
CPC ........... G06Q 50/30; G06Q 10/063116; G06Q 10/06315; G06Q 10/063114;
(Continued)

(56) References Cited

U.S. PATENT DOCUMENTS 8,606,611 B1* 12/2013 Fedorov ............... G06Q 10/103
705/7.13
2010/0153013 A1 6/2010 Kondo et al.
(Continued)

FOREIGN PATENT DOCUMENTS

CN 100397434 C * 6/2008
CN 102402852 A 4/2012
(Continued)

OTHER PUBLICATIONS

The World Intellectual Property Organization (WIPO) International Search Report for PCT/CN2018/082699 dated May 30, 2018 5 Pages (including translation).

*Primary Examiner* — Daniel Lai
(74) *Attorney, Agent, or Firm* — Anova Law Group, PLLC

(57) ABSTRACT

A location information processing method and apparatus, a storage medium, and a processor are provided. The method includes obtaining motion information of a plurality of first terminals at a current moment; generating a location sequence of the plurality of first terminals according to the motion information, the location sequence indicating correspondence between locations of the plurality of first terminals and one or more future moments; receiving a first viewing request from a target terminal, the first viewing request requesting to view locations of the plurality of first terminals at a target moment, the target moment being one of the future moments; searching the location sequence for the locations of the plurality of first terminals at the target moment according to the first viewing request; and sending indication information to the target terminal, the indication information indicating the locations of the plurality of first terminals at the target moment.

21 Claims, 9 Drawing Sheets

(58) Field of Classification Search
CPC ........... G06Q 10/0833; G06Q 30/0266; G06Q 30/0639; G06Q 10/025; G06Q 10/04; G06Q 30/0205; H04W 4/029; H04W 4/021; H04W 4/40; H04W 4/023; H04W 4/02; H04W 4/70; H04W 64/006; H04W 4/024; H04W 4/025; H04W 4/30; H04W 4/48; H04W 4/027; H04W 4/44; H04W 4/46; H04W 64/00; H04L 67/22; H04L 29/08; H04L 67/18; G08G 1/012; G08G 1/123; G08G 1/20; G08G 1/005; G08G 1/205; G01C 21/34

See application file for complete search history.

(56) References Cited

U.S. PATENT DOCUMENTS

| | | | |
|---|---|---|---|
| 2015/0161543 A1* | 6/2015 | Kadir | G06Q 10/06314 705/7.24 |
| 2016/0049075 A1* | 2/2016 | Sato | G09B 29/007 340/905 |
| 2016/0232793 A1 | 8/2016 | Morishita et al. | |
| 2016/0364678 A1* | 12/2016 | Cao | G06Q 50/30 |
| 2017/0098373 A1* | 4/2017 | Filley | H04W 4/90 |
| 2017/0123421 A1* | 5/2017 | Kentley | B60W 30/00 |
| 2017/0262790 A1* | 9/2017 | Khasis | G01C 21/3415 |

FOREIGN PATENT DOCUMENTS

| | | |
|---|---|---|
| CN | 104121918 A | 10/2014 |
| CN | 105580062 A | 5/2016 |

\* cited by examiner

| Target moment | One minute in the future | Three minutes in the future | Five minutes in the future | Ten minutes in the future |
|---|---|---|---|---|
| Location data | Location data 1 | Location data 2 | Location data 3 | Location data 4 |

LOCATION INFORMATION PROCESSING METHOD AND APPARATUS, STORAGE MEDIUM AND PROCESSOR

CROSS-REFERENCES TO RELATED APPLICATIONS

This application claims priority to PCT Application No. PCT/CN/2018/082699, filed on Apr. 11, 2018, which claims priority to Chinese Patent Application No. 201710233235.9, entitled "LOCATION INFORMATION PROCESSING METHOD AND APPARATUS," filed with the Chinese National Intellectual Property Administration on Apr. 11, 2017. The two applications are incorporated by reference in their entirety.

FIELD OF THE TECHNOLOGY

The present disclosure relates to the field of data processing, and specifically, to a location information processing method and apparatus, a storage medium, and a processor.

BACKGROUND OF THE DISCLOSURE

In a mobile map, only location information of a target object at a current moment is presented. Often, presented information lacks a dimension of time, and prediction about location information of the target object in the future are not provided. For example, as shown in FIG. 1, when a user searches for a shared bicycle, location information of a shared bicycle in a map at current moment can be seen, and an attempt to check whether a shared bicycle would appear within several minutes in the future in the target area cannot be accomplished. In another example, as shown in FIG. 2, a mobile map can present a traffic condition of a section of road inside a target area at the current moment and identify a traffic congestion degree of the section of the road with a gradient color from green to red, but does not present a traffic condition of the section of the road at a future moment.

SUMMARY

Embodiments of the present disclosure provide a location information processing method and an apparatus, a storage medium, and a processor, to resolve at least one technical problem that location information at a future moment cannot be displayed in a map.

According to an aspect of the embodiments of the present disclosure, a location information processing method is provided. The method includes the steps of obtaining motion information of a plurality of first terminals at a current moment; generating a location sequence of the plurality of first terminals according to the motion information, the location sequence indicating correspondence between locations of the plurality of first terminals and one or more future moments; and receiving a first viewing request from a target terminal, the first viewing request requesting to view locations of the plurality of first terminals at a target moment, the target moment being one of the future moments. The method further includes searching the location sequence for the locations of the plurality of first terminals at the target moment according to the first viewing request; and sending indication information to the target terminal, the indication information indicating the locations of the plurality of first terminals at the target moment.

According to another aspect of the embodiments of the present disclosure, another location information processing method is further provided. The method includes sending a first viewing request to a server, the first viewing request requesting to view locations of a plurality of first terminals at a target moment, the server searching a location sequence for the locations of the plurality of first terminals at the target moment according to the first viewing request; and receiving indication information from the server according to the first viewing request, the indication information indicating the locations of the plurality of first terminals at the target moment. The method further includes displaying the locations of the plurality of first terminals at the target moment.

According to an aspect of the embodiments of the present disclosure, a location information processing apparatus is provided. The apparatus includes a first obtaining unit, configured to obtain motion information of a plurality of first terminals at a current moment; and a first generating unit, configured to generate a location sequence of the plurality of first terminals according to the motion information, the location sequence representing correspondences between locations of the plurality of first terminals and one or more future moments. The apparatus further includes a first receiving unit, configured to receive a first viewing request from a target terminal, the first viewing request requesting to view the locations of the plurality of first terminals at a target moment, the target moment being any one of the one or more moments; a searching unit, configured to search the location sequence for locations of the plurality of first terminals at the target moment according to the first viewing request; and a first sending unit, configured to send indication information to the target terminal, the indication information indicating the locations of the plurality of first terminals at the target moment.

In the embodiments of the present disclosure, a location information processing apparatus obtains motion information of a plurality of first terminals at a current moment; generates a location sequence of the plurality of first terminals according to the motion information, the location sequence being used to represent correspondences between locations of the plurality of first terminals and one or more moments that are after the current moment. The apparatus further receives a first viewing request sent by a target terminal, the first viewing request being used to request to view the locations of the plurality of first terminals at a target moment, the target moment being any one of the one or more moments. The apparatus searches the location sequence for the locations of the plurality of first terminals at the target moment according to the first viewing request; and sends indication information to the target terminal. The indication information is used to indicate the locations of the plurality of first terminals at the target moment. The apparatus generates the estimated locations of the plurality of first terminals at one or more moments in the future according to the motion information of the plurality of first terminals at the current moment, and when the viewing request is received from the target terminal. Information used to indicate estimated locations of the plurality of first terminals at a future moment is sent to the target terminal according to the viewing request, to display the locations of the plurality of first terminals at the future moment on the target terminal. Embodiments of the present disclosure achieve a technical effect of displaying estimated location information at a future moment in a map, and provide estimated location information at a future moment on a map.

BRIEF DESCRIPTION OF THE DRAWINGS

Accompanying drawings described herein are used to provide further understanding about the present disclosure, and constitute one portion of this application. Exemplary embodiments of the present disclosure and their descriptions are used to explain the present disclosure, and do not constitute an inappropriate limitation on the present disclosure, in the figures.

DESCRIPTION OF EMBODIMENTS

To make a person skilled in the art understand the technical solutions in the present disclosure better, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

It should be noted that the terms "first", "second", and the like in the specification, the claims, and the foregoing accompanying drawings of the present disclosure are merely used for distinguishing similar objects, and do not need to be used for describing a special sequence or order. It should be understood that data used in this way can be interchanged in an appropriate case, so that the embodiments of the present disclosure that are described herein can be implemented in a sequence other than those sequences illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

According to the embodiments of the present disclosure, a method embodiment of a location information processing method is provided.

Figure 1:
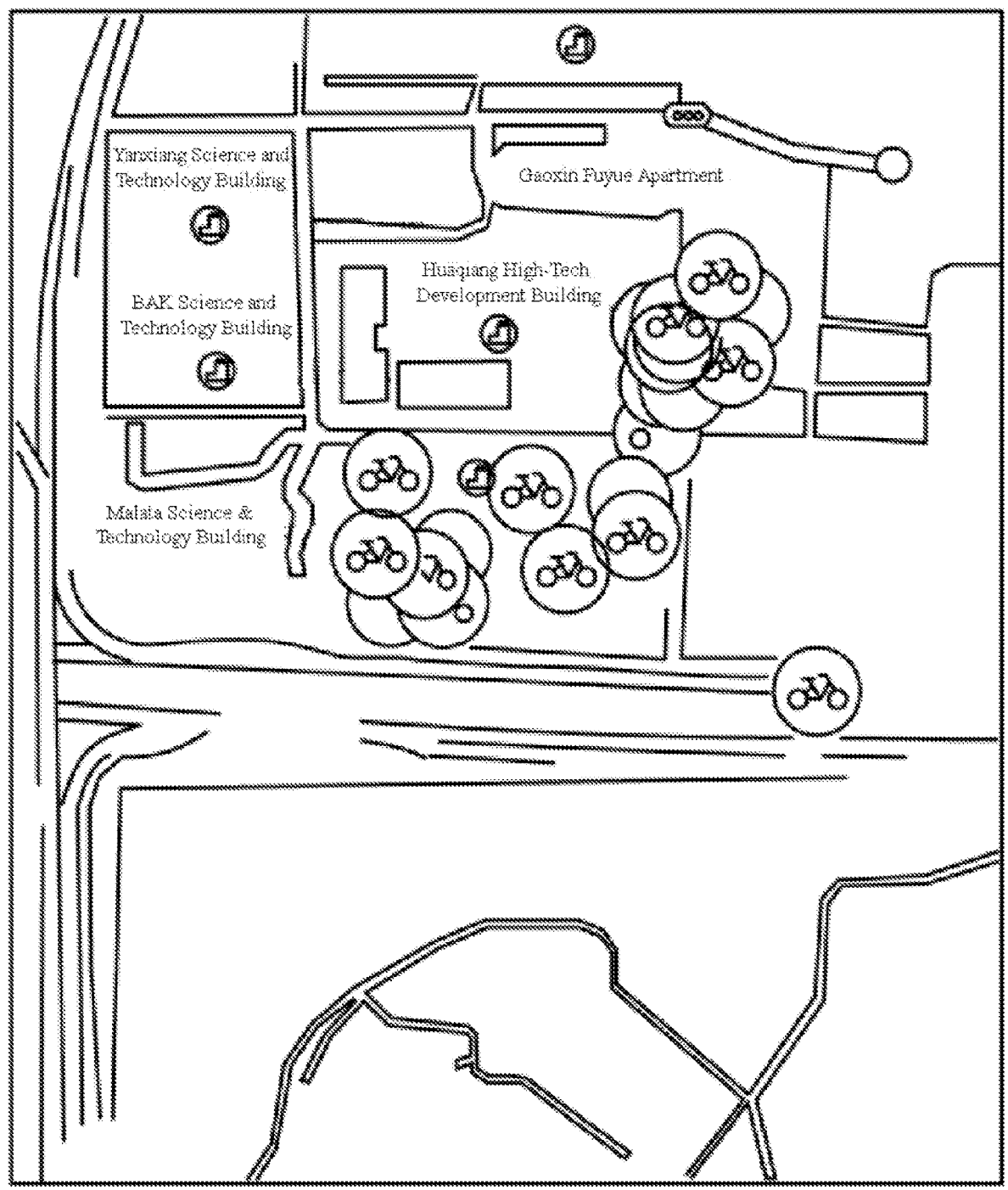
FIG. 1 is a schematic diagram of displaying a location of a shared bicycle in a mobile map.
Figure 2:
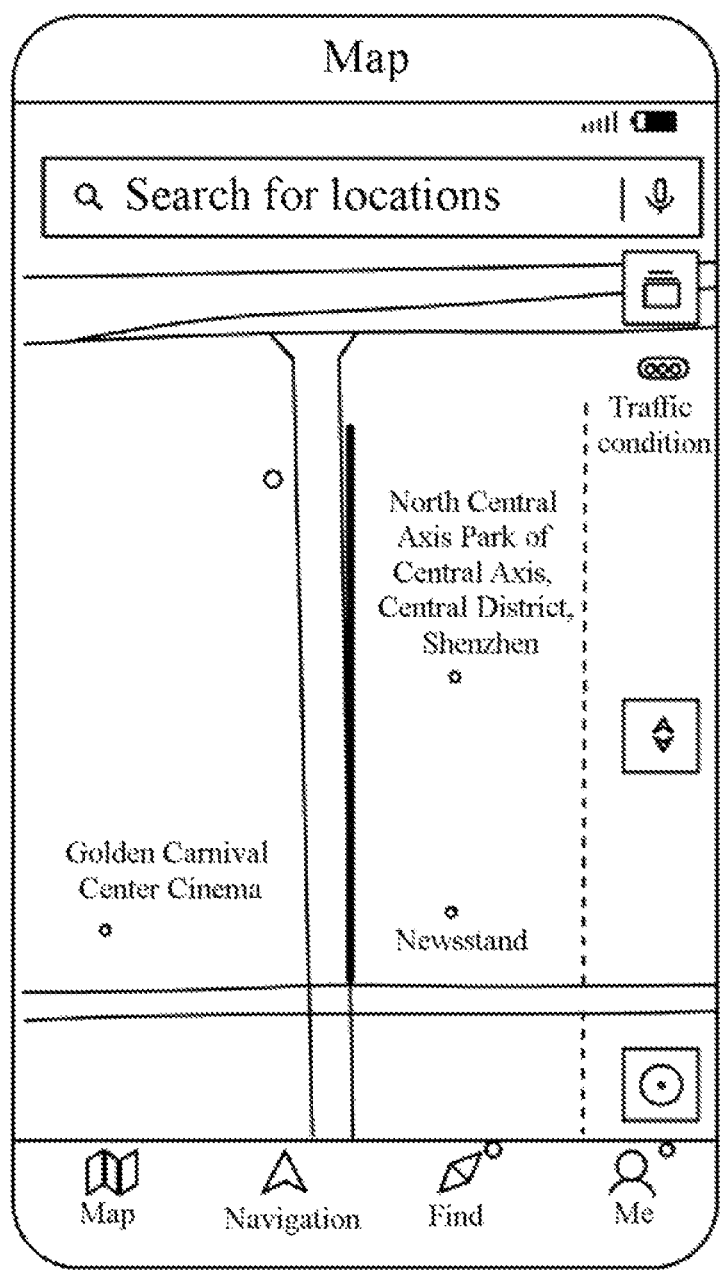
FIG. 2 is a schematic diagram of displaying a traffic condition of a target area in a mobile map.
Figure 3:
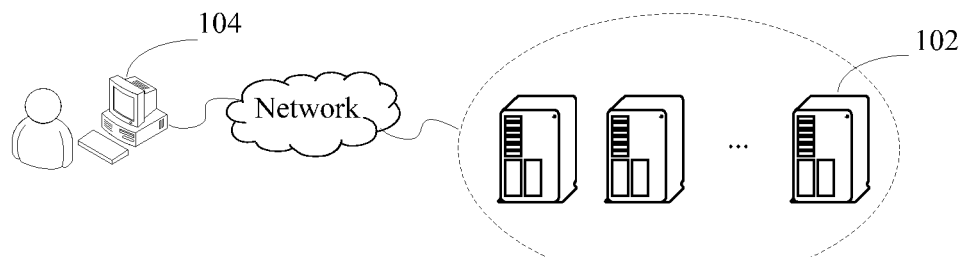
FIG. 3 is a schematic diagram of a hardware environment of a location information processing method according to an embodiment of the present disclosure.

In some embodiments, in this embodiment, the foregoing location information processing method may be implemented in a hardware environment formed by a server 102 and a terminal 104 shown in FIG. 3. As shown in FIG. 3, a server 102 is connected to a terminal 104 through a network. The foregoing network includes, but is not limited to, a wide area network, a metropolitan area network, or a local area network. The terminal 104 includes, but is not limited to, a computer, a mobile phone, a tablet computer, or the like. The location information processing method in the embodiments the present disclosure can be performed by the server 102, or be performed by the terminal 104, or be performed by the server 102 and the terminal 104 together. The terminal 104 may perform the location information processing method in the embodiments of the present disclosure by using a client installed on the terminal 104.

Figure 4:
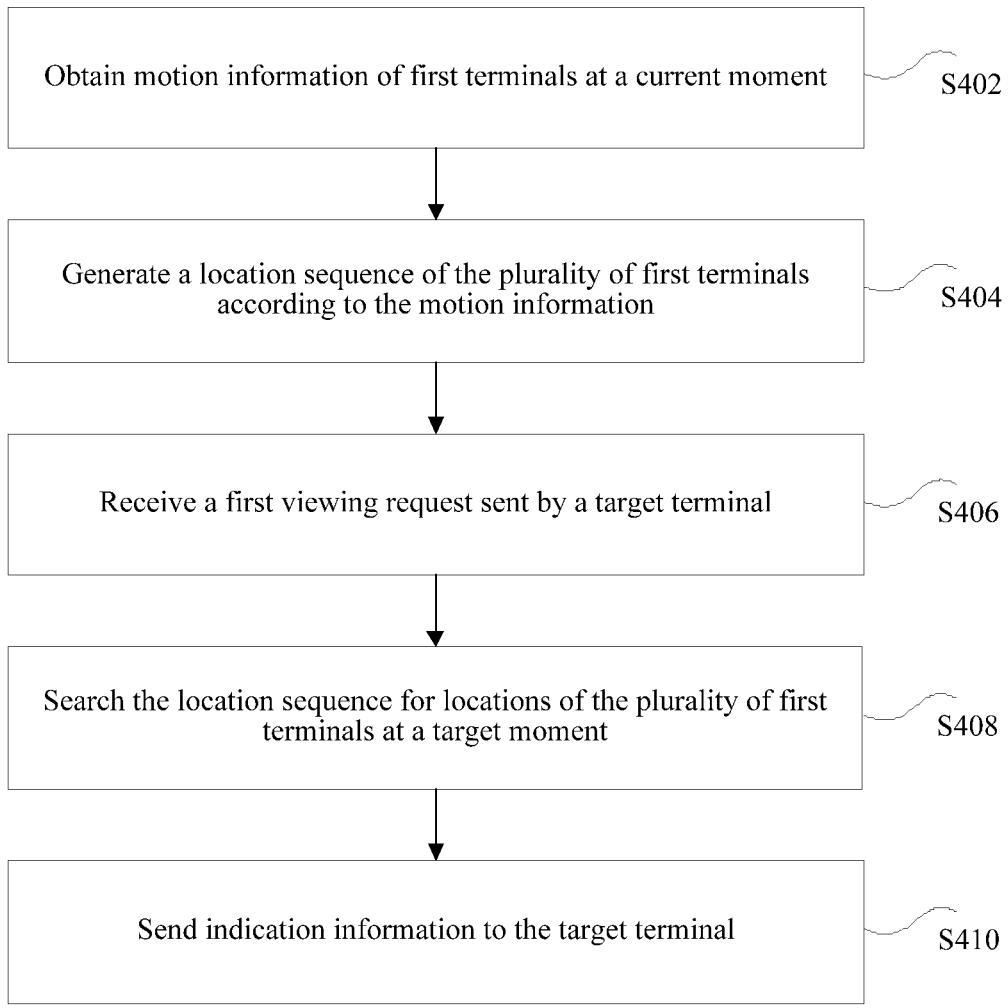
FIG. 4 is a flowchart of a location information processing method according to an embodiment of the present disclosure.

FIG. 4 is a flowchart of a location information processing method according to an embodiment of the present disclosure. As shown in FIG. 4, the method may include the following steps:

Step S402: Obtain motion information of a plurality of first terminals at a current moment.

Step S404: Generate a location sequence of the plurality of first terminals according to the motion information, the location sequence being used to represent correspondences between locations of the plurality of first terminals and one or more moments that are after the current moment.

Step S406: Receive a first viewing request sent by a target terminal, the first viewing request being used to request to view the locations of the plurality of first terminals at a target moment, the target moment being any one of the one or more moments.

Step S408: Search the location sequence for the locations of the plurality of first terminals at the target moment according to the first viewing request.

Step S410: Send indication information to the target terminal, the indication information being used to indicate the locations of the plurality of first terminals at the target moment.

In the foregoing steps S402 to S410, locations of the plurality of first terminals at one or more moments in the future are generated according to the motion information of the plurality of first terminals at the current moment, and when the viewing request is received from the target terminal, information used to indicate estimated locations of the plurality of first terminals at a future moment is sent to the target terminal according to the viewing request, to display the estimated locations of the plurality of first terminals at the future moment on the target terminal. Embodiments of the present disclosure resolve a technical problem that location information at a future moment cannot be displayed on in a map, thereby achieving a technical effect of displaying estimated location information at a future moment on a map.

In the embodiment implemented by step S402, the first terminal may report motion information through the Global Positioning System (GPS) and a mobile network. For example, the first terminal may be a smartphone, a vehicle navigation system, a smart watch, an in-vehicle terminal having a positioning function and a network communication function, or the like. The server obtains the motion information, such as a location, a speed, and a planned moving path of the first terminal at a current moment, reported by the first terminal at a specific sampling frequency.

In the embodiment implemented by step S404, the server calculates locations of the plurality of first terminals at a future moment according to the obtained motion information of the plurality of first terminals at the current moment, and generates a location sequence of the plurality of first terminals according to the locations of the plurality of first terminals at the future moment. The location sequence is used to represent the locations of the plurality of first terminals at the future moment. The future moment includes one or more moment after the current moment, and the future moment in the location sequence corresponds to the locations of the plurality of first terminals at the future moment. For example, the current moment is 5 o'clock, and the future moment includes a moment that is one minute later than the current moment and a moment that is five minutes later than the current moment. The server obtains motion information reported by the plurality of first terminals at the current moment (5 o'clock), calculates locations of the plurality of first terminals at 5:01 and 5:05 according to location information at the current moment, and generates a location sequence according to information of the calculated locations of the plurality of first terminals at future moments. The location sequence represents the locations of the plurality of first terminals at 5:01 and 5:05. In addition, as time goes by, a time of the current moment continuously changes, a time point of the future moment also changes accordingly, and the server may also re-obtain motion information of the plurality of first terminals at the current moment, and calculate locations of the plurality of first terminals at the future moment of the current moment. For example, when the current moment changes to 5:10, the future moments of the current moment change to 5:11 and 5:15, and the server obtains motion information of the plurality of first terminals at 5:10, calculates locations of the plurality of first terminals at 5:11 and 5:15 according to the information, and then, generates a new location sequence to represent the locations of the plurality of first terminals at 5:11 and 5:15. The location sequence generated at 5 o'clock is replaced with the newly generated location sequence. Therefore, the location sequence is a latest location sequence generated by the server according to location information of the plurality of first terminals at the current moment.

In the embodiment implemented by step S206, the server receives the first viewing request sent by the target terminal at the current moment to request to view the locations of the plurality of first terminals at the target moment. When the moment at which the target terminal sends the first viewing request to the server is the current moment, the target moment is a future moment of the current moment, and when the location sequence generated by the server includes a plurality of future moments of the current moment, the target terminal may select any one of the plurality of future moments as the target moment. For example, if the target terminal sends a first viewing request to the server at 5 o'clock to view locations of the plurality of first terminals at 5:05, the current moment is 5 o'clock, and 5:05 is the target moment.

In the embodiment implemented by step S408, after receiving the first viewing request sent by the target terminal, the server searches, according to the target moment in the first viewing request, the location sequence for the locations of the plurality of first terminals at the target moment.

In the embodiment implemented by step S410, the server sends indication information to the target terminal according to the found locations of the plurality of terminals at the target moment, to indicate the locations of the plurality of first terminals at the target moment.

In some embodiments, the first viewing request is used to request to view the locations of the plurality of first terminals inside a first target area at the target moment, and the searching the location sequence for the locations of the plurality of first terminals at the target moment according to the first viewing request includes: obtaining locations of the plurality of first terminals corresponding to the target moment from the location sequence, to obtain the first location information; sifting out locations of the plurality of first terminals inside the first target area from the first location information, to obtain second location information; and generating the indication information according to the second location information.

In one embodiment, when the target terminal sends the first viewing request to the server to request to view locations of the plurality of first terminals, an area that is requested to view is limited. That is, the first viewing request sent by the target terminal is used to request to view locations of the plurality of first terminals inside the first target area at the target moment. The first target area is an area that the target terminal requests to view. The server obtains, according to a first target moment in the first viewing request, locations of the plurality of first terminals corresponding to the target moment in the location sequence, to obtain first location information, and further sifts the first location information according to the first target area, to obtain second location information. Locations of the plurality of first terminals in the second location information are locations of the plurality of first terminals in the first target area at the target moment.

Figure 5:
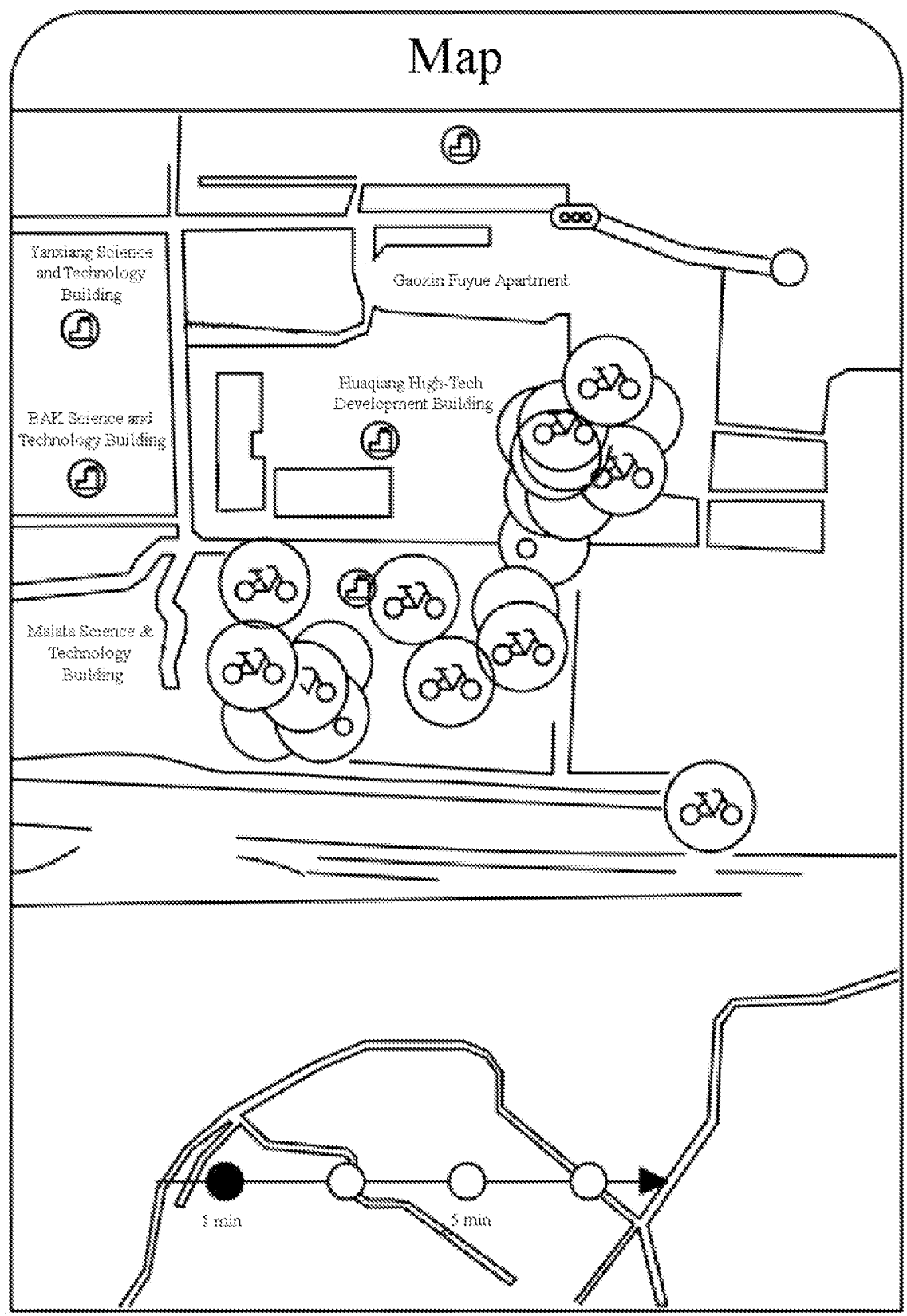
FIG. 5 is a schematic diagram of a location of a shared bicycle inside a first target area at a future moment one minute from the present according to an embodiment of the present disclosure.
Figure 6:
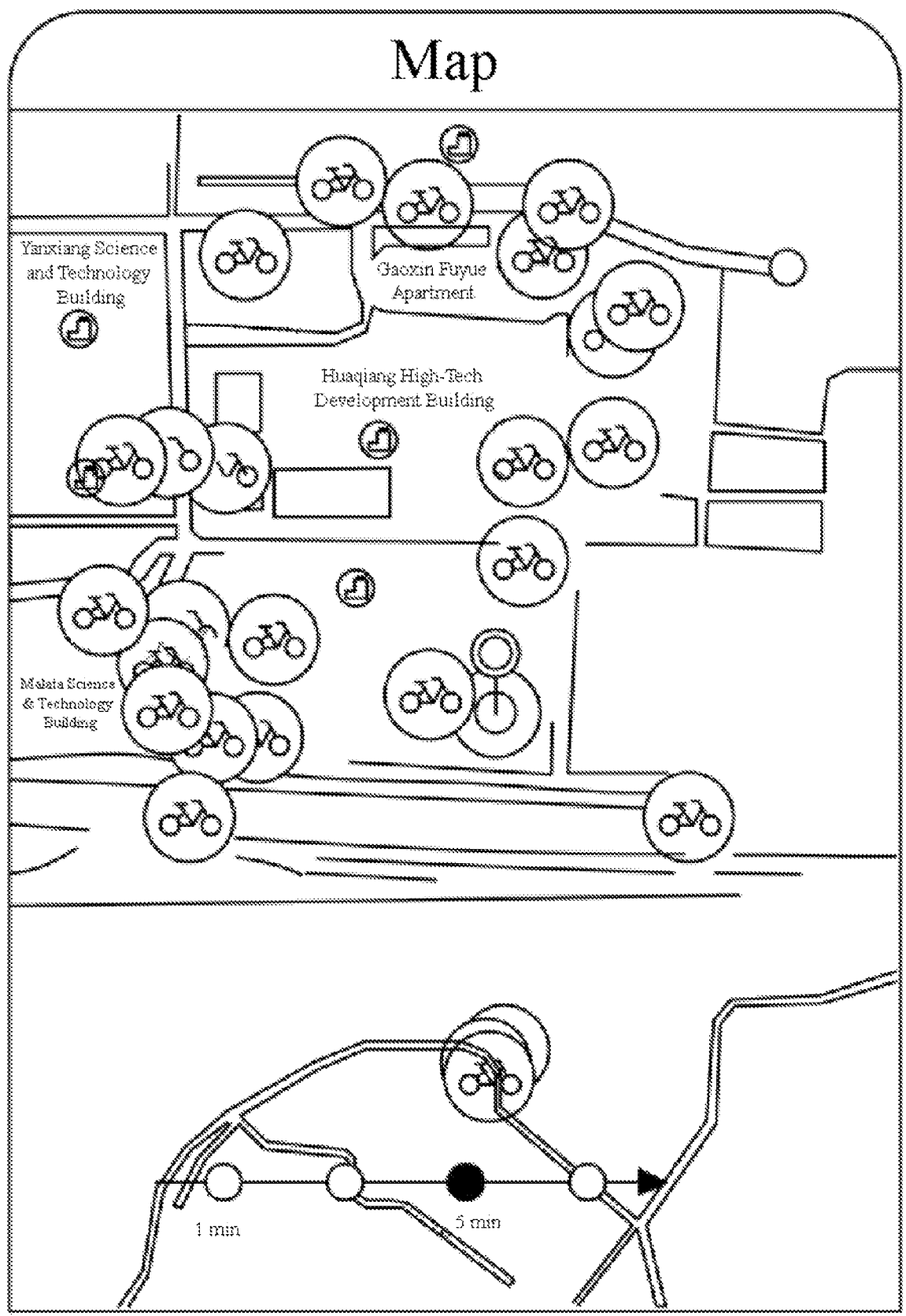
FIG. 6 is a schematic diagram of a location of a shared bicycle inside a first target area at a future moment in five minutes according to an embodiment of the present disclosure.

As shown in FIG. 5, the target terminal requests to view a location of a shared bicycle inside the first target area at the target moment after one minute. The server calculates, according to the obtained motion information of all shared bicycles at the current moment, locations of all the shared bicycles at a moment one minute in the future, and stores the locations in the location sequence. After receiving a viewing request from the target terminal, the server searches the location sequence for the locations of all the shared bicycles corresponding to the moment one minute in the future, sifts out locations of shared bicycles located inside the first target area, and sends the estimated locations to the target terminal, to display the locations inside the first target area in a map of the target terminal. FIG. 6 shows an estimated location of a shared bicycle inside the first target area at a moment 5 minutes in the future.

In some embodiments, after the generating a location sequence of the plurality of first terminals according to the motion information, the method further includes: receiving a second viewing request from the target terminal, the second viewing request being used to request to view traffic condition information of a second target area at the target moment; obtaining locations of the plurality of first terminals corresponding to the target moment from the location sequence according to the second viewing request, to obtain third location information; counting the first terminals inside the second target area according to the third location information; determining the traffic condition information according to the quantity of the first terminals; and sending the traffic condition information to the target terminal.

In some embodiments, the server may determine estimated locations of the plurality of first terminals at a future moment according to the motion information of the plurality of first terminals, and further, determine traffic condition information at the future moment. Specifically, the target terminal may send a second viewing request to the server, to request to view traffic condition information inside a second target area. For example, a user may send a second viewing request to the server, to learn about whether a traffic condition inside a second target area is congested in 10 minutes. The server searches, according to a target moment in the second viewing request, the location sequence for location information of the plurality of first terminals corresponding to the target moment, to third location information, and then, count a quantity of the first terminals inside the second target area according to the third location information.

In some embodiments, the server determines, according to size of the second target area, a threshold for determining traffic condition information, and determines traffic condition information of the second target area according to a relationship between the quantity of the first terminals inside the second target area and the threshold. For example, the second target area includes a road section that is 100 meters long, and the server sets two thresholds, 20 and 50, in total, to determine a traffic condition of the road section. Specifically, when fewer than 20 vehicles are traveling on the road section, the traffic condition of the road section is smooth; when a quantity of vehicles traveling on the road section is greater than 20 but is fewer than 50, the traffic condition of the road section is slow; and when a quantity of vehicles traveling on the road section is greater than 50, the traffic condition of the road section is congested.

The server obtains estimated locations of the plurality of first terminals at the target moment according to the second viewing request, further counts a quantity of the first terminals inside a second area, determines traffic condition information of the second area at the target moment by determining the quantity of the first terminals inside the second area and a specified threshold, and sends the traffic condition information to the target terminal. In some embodiments, different traffic condition information may be directly displayed on the target terminal in a manner such as a color. For example, when the traffic condition is smooth, a corresponding road section in the map of the target terminal is displayed in green, when the traffic condition is slow, the corresponding road section in the map of the target terminal is displayed in yellow, and when the traffic condition is congested, the corresponding road section in the map of the target terminal is displayed in red.

Figure 7:
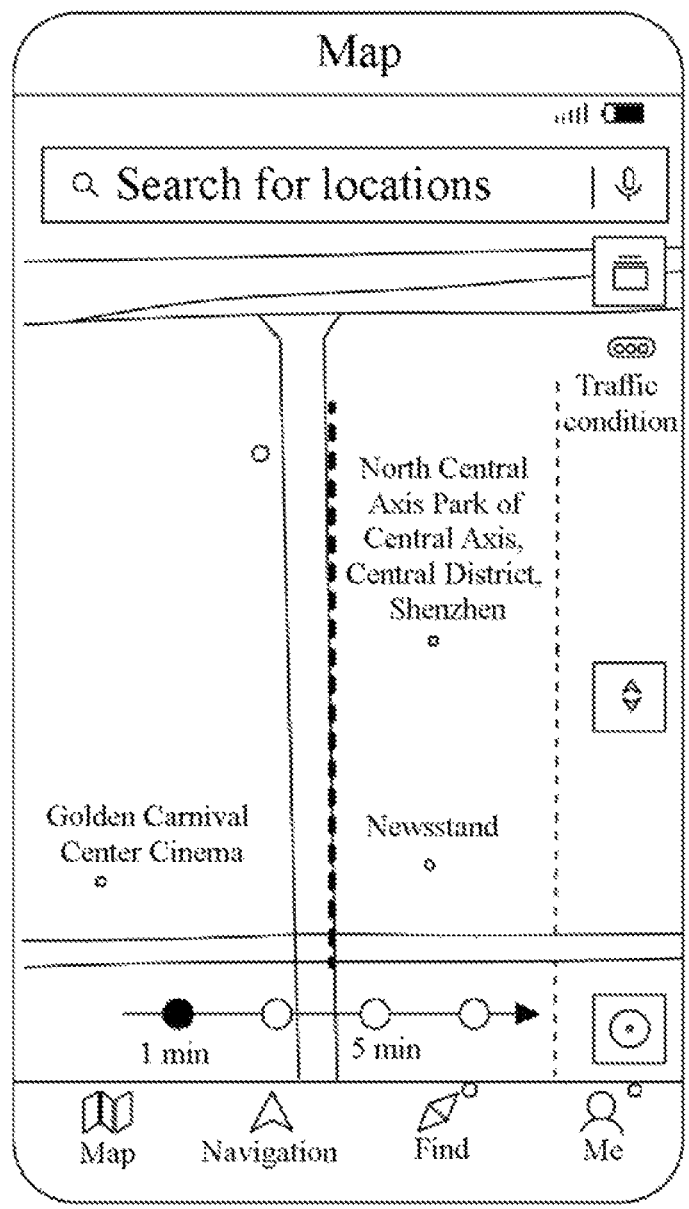
FIG. 7 is a schematic diagram of traffic condition information inside a second target area at a future moment one minute from the present according to an embodiment of the present disclosure.
Figures 8, 9:
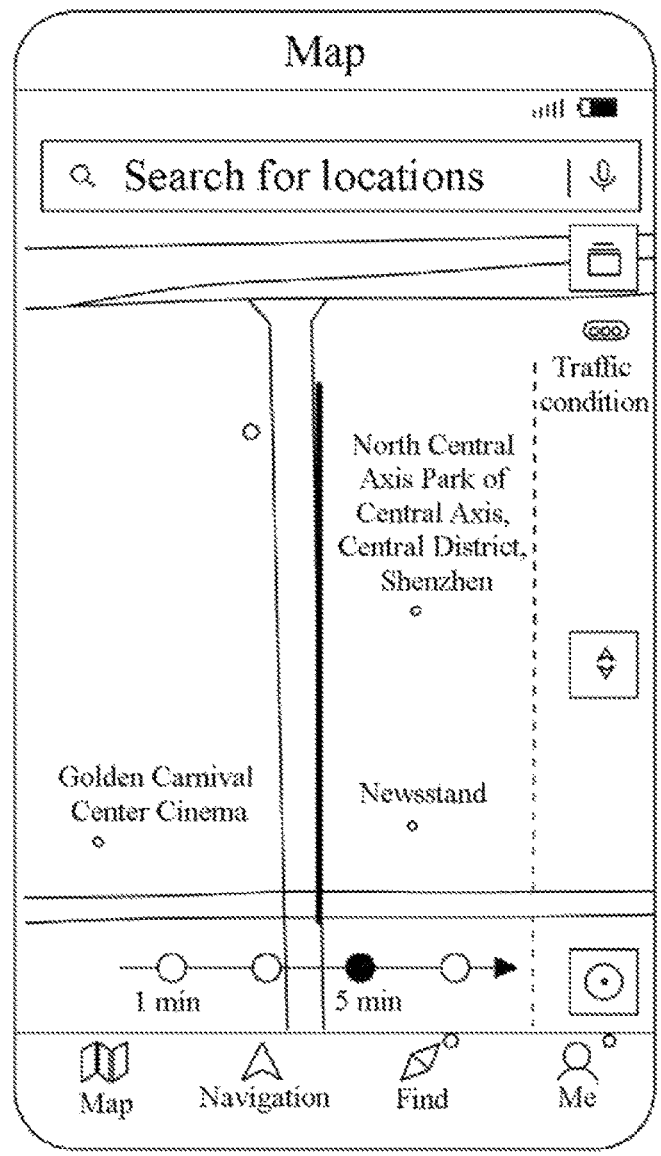
FIG. 8 is a schematic diagram of traffic condition information inside a second target area at a future moment (in five minutes) according to an embodiment of the present disclosure.
FIG. 9 is a schematic diagram of a location sequence according to an embodiment of the present disclosure.

As shown in FIG. 7, the target terminal requests the server for viewing traffic condition information inside the second target area at a moment one minute in the future. The server determines that traffic condition information of the road section is slow according to a quantity of vehicles traveling on the target road section inside the second target area at the moment one minute in the future, and sends the traffic condition information to the target terminal, to enable the target terminal to identify the road section in the map to be slow. As shown in FIG. 8, the target terminal requests the server for viewing traffic condition information inside the second target area at a moment after five minutes in the future. If the server determines that traffic condition information of the road section is congested according to a quantity of vehicles traveling on the target road section inside the second target area at the moment after five minutes in the future, the server sends the traffic condition information to the target terminal, and the target terminal identifies, according to the received traffic condition information, the road section inside the second target area to be congested.

In some embodiments, the obtaining motion information of a plurality of first terminals at a current moment includes: obtaining current locations, current moving speeds, and moving paths of the plurality of first terminals; and the generating a location sequence of the plurality of first terminals according to the motion information includes: generating the location sequence according to the current locations, the current moving speeds, and the moving paths of the plurality of first terminals.

In one implementation, the motion information of a plurality of first terminals obtained by the server includes: current locations, current moving speeds, and moving paths of the plurality of first terminals. The server calculates locations of the plurality of first terminals at a future moment of the current moment according to the current locations, the current moving speeds, and the moving paths of the plurality of first terminals, and generates the location sequence. When the server calculates the locations of the plurality of first terminals at the future moment according to the current locations, the current moving speeds, and the moving paths of the plurality of first terminals, the current moving speeds of the first terminals are moving speeds of the first terminals by default, and current planned moving paths do not change until the server obtains locations, moving speeds, and moving paths of the first terminals at a next moment again, and calculates locations of the first terminals at a future moment of the next moment according to the newly obtained locations, moving speeds, and moving paths.

In some embodiments, when the server calculates locations of the first terminals at a future moment according to current motion information, or may correct the current speeds of the first terminals according to traffic condition information on the moving paths of the first terminal at the current moment, and calculates locations of the first terminals at a future moment according to the corrected speeds. For example, if the server obtains that a current speed of a first terminal is 60 meters/second, and learns that the first terminal is about to enter a slow-moving road section having a highest speed of 30 meters/second according to a current moving path of the first terminal and traffic condition information at a current moment, when the server calculates a location of the first terminal at a moment five minutes in the future according to current motion information of the first terminal, the server needs to correct a current speed of the first terminal with reference to a traffic condition. In some embodiments, a moving distance of the first terminal is calculated according to 30 meters/second in a slow-moving road section, and a moving distance of the first terminal is calculated according to 60 meters/second in a non-slow-moving road section.

In some embodiments, generating the location sequence according to the current locations, the current moving speeds, and the moving paths of the plurality of first terminals includes: determining a location of each first terminal at each moment in a target time sequence according to the current location, the current moving speed, and the moving path of the first terminal, the target time sequence including the one or more moments that are after the current moment; and using the target time sequence having the locations of the plurality of first terminals as the location sequence, each moment in the location sequence corresponding to locations of the plurality of first terminals.

In an optional implementation, the server uses a future moment of the current moment including one or more moments as a target time sequence, calculates a location of each first terminal at each moment in the target time sequence according to a location, a moving speed, and a moving path of the first terminal at the current moment, and then, uses the target time sequence and locations of the foregoing plurality of first terminals corresponding to the target time sequence as a location sequence generated at the current moment. As shown in FIG. 9, the target time sequence includes a total of four moments, that is, one minute in the future, three minutes in the future, five minutes in the future, and ten minutes in the future, and each moment corresponds to location data of a plurality of first terminals at the moment.

According to the embodiments of the present disclosure, a method embodiment of another location information processing method is provided.

Figure 10:
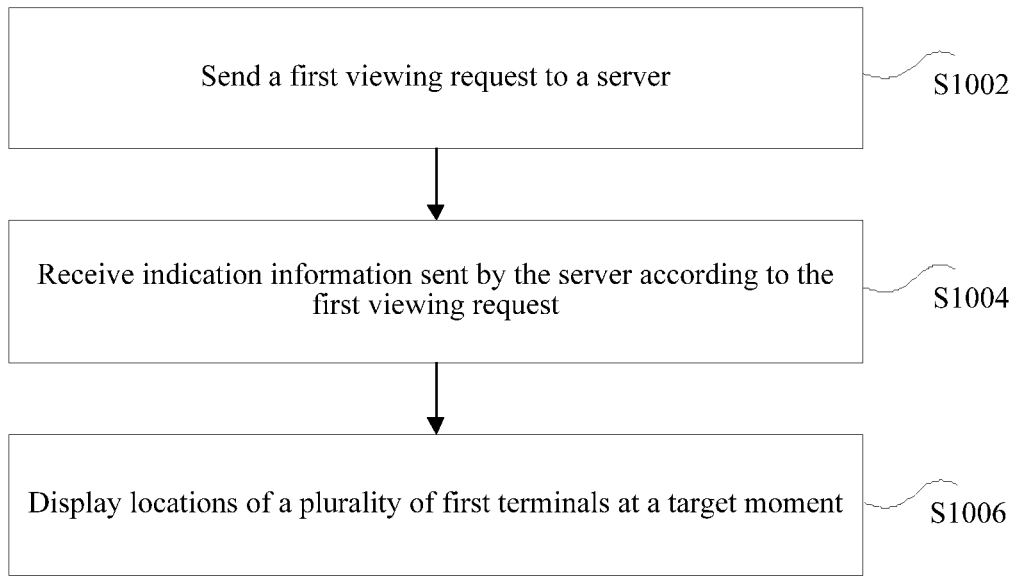
FIG. 10 is a flowchart of another location information processing method according to an embodiment of the present disclosure.

FIG. 10 is a flowchart of another location information processing method according to an embodiment of the present disclosure. As shown in FIG. 10, the method may include the following steps:

Step S1002: Send a first viewing request to a server, the first viewing request being used to request to view locations of a plurality of first terminals at a target moment, to enable the server to search a location sequence for the locations of the plurality of first terminals at the target moment according to the first viewing request, the location sequence being generated by the server according to motion information of the plurality of first terminals at a current moment and being used to indicate correspondences between locations of the plurality of first terminals and one or more moments that are after the current moment, and the target moment being any one of the one or more moment.

Step S1004: Receive indication information sent by the server according to the first viewing request, the indication information being used to indicate the estimated locations of the plurality of first terminals at the target moment.

Step S1006: Display the locations of the plurality of first terminals at the target moment.

In the foregoing steps S1002 to S1006, a first viewing request is sent to the server, to request to view locations of a plurality of first terminals at a future moment predicted by the server according to locations of the plurality of first terminals at the current moment, to resolve a technical problem that location information at a future moment cannot be displayed in a map, thereby achieving a technical effect of viewing, at a current moment, estimated locations of the plurality of first terminals at a future moment.

In the embodiment implemented by step S1002, the first terminal may report motion information through the GPS and a mobile network. For example, the plurality of first terminals may be smartphones, vehicle navigation systems, smart watches, in-vehicle terminals having a positioning function and a network communication function, or the like. The server may obtain the motion information, such as locations, speeds, and planned moving paths of the plurality of first terminals at a current moment, reported by the plurality of first terminals at a specific sampling frequency. The server may calculate locations of the plurality of first terminals at a future moment according to the obtained motion information of the plurality of first terminals at the current moment, and generates a location sequence of the plurality of first terminals according to the locations of the plurality of first terminals at the future moment. The location sequence is used to represent the locations of the plurality of first terminals at the future moment. The future moment may include one or more moment after the current moment, and the future moment in the location sequence corresponds to the locations of the plurality of first terminals at the future moment. For example, the current moment may be 5 o'clock, and the future moments may include a moment that is one minute later than the current moment and a moment that is five minutes later than the current moment. The server may obtains motion information reported by the plurality of first terminals at the current moment (5 o'clock), calculates locations of the plurality of first terminals at 5:01 and 5:05 according to location information at the current moment, and generates a location sequence according to information of the calculated locations of the plurality of first terminals at future moments. The location sequence may represent the estimated locations of the plurality of first terminals at 5:01 and 5:05.

It should be noted that, as time goes by, the time of the current moment continuously changes. The time point of the future moment also changes accordingly, and the server may also re-obtain motion information of the plurality of first terminals at the current moment, and calculate locations of the plurality of first terminals at the future moment of the current moment.

For example, when the current moment changes to 5:10, the future moments of the current moment change to 5:11 and 5:15, and the server obtains motion information of the plurality of first terminals at 5:10, calculates locations of the plurality of first terminals at 5:11 and 5:15 according to the information, and then, generates a new location sequence to represent the locations of the plurality of first terminals at 5:11 and 5:15. The location sequence generated at 5 o'clock is replaced with the newly generated location sequence. Therefore, the location sequence is a latest location sequence generated by the server according to location information of the plurality of first terminals at the current moment. A user sends the first viewing request to the server through the target terminal. The server searches, according to the target moment in the received first viewing request, the location sequence for the locations of the plurality of first terminals at the target moment.

In the embodiment implemented by step S410, the server generates indication information according to the found locations of the plurality of terminals at the target moment, and sends the indication information to the target terminal, to indicate the locations of the plurality of first terminals at the target moment.

In the embodiment implemented by step S1006, the target terminal displays the locations of the plurality of first terminals at the target moment in the map according to the received indication information.

In some embodiments, before the first viewing request is sent to the server, the method further includes: presenting a target time sequence, the target time sequence including the one or more moments that are after the current moments; receiving indication information, the indication information being used to indicate one of the moments that is selected from the target time sequence as the target moment; and generating the first viewing request according to the indication information.

In some embodiments, the target terminal presents a target time sequence in a display interface of the map. The target time sequence includes a future moment of the current moment, and the future moment corresponds to one or more moments in the location sequence generated by the server. In some embodiments, the presented target time sequence may be in various forms such as a time axis form and a time option form, and the user may send indication information to the target terminal by sliding a time axis or selecting a time option, to select one moment from the target time sequence as the target moment in the first viewing request. The target terminal generates the first viewing request according to the received indication information, and sends it to the server.

In some embodiments, the first viewing request further includes a first target area, the first viewing request being used to request to view locations of the plurality of first terminals in the first target area at the target moment; the receiving indication information sent by the server according to the first viewing request includes: receiving indication information sent by the server, the indication information being used to indicate the locations of the plurality of first terminals inside the first target area at the target moment; and the displaying the locations of the plurality of first terminals at the target moment includes: displaying the estimated locations of the plurality of first terminals inside the first target area at the target moment.

In some embodiments, an area viewed by the target terminal is a limited area. Therefore, the first viewing request generated on the target terminal further includes the first target area. The first viewing request is used to request to view locations of the plurality of first terminals inside the first target area at the target moment. The server generates the indication information according to the first viewing request, and sends the indication information to the target terminal, to indicate, to the target terminal, the locations of the plurality of first terminals inside the first target area the target moment. The target terminal displays the estimated locations of the plurality of first terminals inside the first target area the target moment in the map according to the received indication information.

In some embodiments, before a first viewing request is sent to a server, or after a first viewing request is sent to a server, the method further includes: sending a second viewing request to the server, the second viewing request being used to request to view traffic condition information of a second target area at the target moment, to enable the server to determine the traffic condition information according to a quantity of the first terminals inside the second target area at the target moment, the quantity of the first terminals inside the second target area being counted by the server according to third location information, the third location information being the locations of the plurality of first terminals corresponding to the target moment obtained by the server from the location sequence according to the second viewing request; receiving the traffic condition information sent by the server; and displaying the traffic condition information of the second target area.

In some embodiments, the target terminal may further view the traffic condition information inside the second target area at the target moment in the future by sending the second viewing request to the server. Specifically, the target terminal sends second viewing request to the server. The second viewing information includes the second target area and the target moment, and the second viewing information is used to request the server to view the traffic condition information inside the second target area at the target moment. The server searches, according to a target moment in the second viewing request, the location sequence for location information of the plurality of first terminals corresponding to the target moment, to third location information, and then, count a quantity of the first terminals inside the second target area according to the third location information.

In some embodiments, the server determines, according to size of the second target area, a threshold for determining traffic condition information, and determines traffic condition information of the second target area according to a relationship between the quantity of the first terminals inside the second target area and the threshold. For example, a user may send a second viewing request to the server, to learn about whether a traffic condition inside a second target area is congested in 10 minutes. The second target area includes a road section that is 100 meters long, and the server sets two thresholds, 20 and 50, in total, to determine a traffic condition of the road section. When fewer than 20 vehicles are traveling on the road section, the traffic condition of the road section is smooth; when a quantity of vehicles traveling on the road section is greater than 20 but is fewer than 50, the traffic condition of the road section is slow; and when a quantity of vehicles traveling on the road section is greater than 50, the traffic condition of the road section is congested. The server obtains locations of the plurality of first terminals at the target moment according to the second viewing request, further counts a quantity of the first terminals inside a second area, determines traffic condition information of the second area at the target moment by determining the quantity of the first terminals inside the second area and a specified threshold, and sends the traffic condition information to the target terminal.

It should be noted that, for ease of description, the foregoing method embodiments are described as a series of action combinations. However, a person skilled in the art should understand that the present disclosure is not limited to the described sequence of the actions, because some steps may be performed in another sequence or performed at the same time according to the present disclosure. In addition, a person skilled in the art should also understand that the embodiments described in this specification all are exemplary embodiments, and the involved actions and modules are not necessarily mandatory to the present disclosure.

Through the descriptions of the preceding embodiments, a person skilled in the art may understand that the methods according to the foregoing embodiments may be implemented by hardware only or by software and a necessary universal hardware platform. However, in most cases, using software and a necessary universal hardware platform are preferred. Based on such an understanding, the technical solutions of the embodiments of the present disclosure essentially, or the part contributing to the prior art may be implemented in a form of a software product. The computer software product is stored in a storage medium (such as a ROM/RAM, a magnetic disk, or a compact disc) and includes several instructions for instructing a terminal device (which may be a mobile phone, a computer, a server, a network device, or the like) to perform the methods described in the embodiments of the present disclosure.

Figure 11:
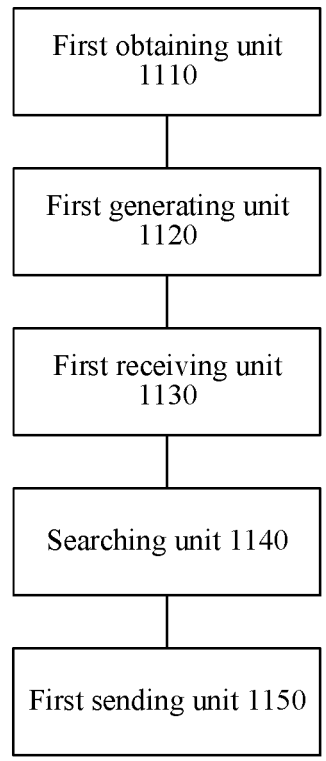
FIG. 11 is a schematic diagram of a location information processing apparatus according to an embodiment of the present disclosure.

According to the embodiments of the present disclosure, a location information processing apparatus configured to perform the foregoing location information processing method is further provided. FIG. 11 is a schematic diagram of a location information processing apparatus according to an embodiment of the present disclosure. As shown in FIG. 11, the apparatus may include: a first obtaining unit 1110, a first generating unit 1120, a first receiving unit 1130, a searching unit 1140, and a first sending unit 1150.

It should be noted that the first obtaining unit 1110 in this embodiment can be configured to perform step S402 in the foregoing embodiment of this application, the first generating unit 1120 in this embodiment can be configured to perform step S404 in the foregoing embodiment of this application, the first receiving unit 1130 in this embodiment can be configured to perform step S406 in the foregoing embodiment of this application, the searching unit 1140 in this embodiment can be configured to perform step S408 in the foregoing embodiment of this application, and the first sending unit 1150 in this embodiment can be configured to perform step S410 in the foregoing embodiment of this application.

It should be noted herein that implemented examples and application scenarios of the foregoing units are the same those of the corresponding steps, but are not limited to the content disclosed by the foregoing embodiment. It should be noted that the foregoing units can operate as a part of the apparatus in a hardware environment as shown in FIG. 3, and can be implemented through software or hardware.

The foregoing units can resolve a technical problem that location information at a future moment cannot be displayed on in a map, thereby achieving a technical effect of displaying locations of first terminals at a future moment on a target terminal.

In some embodiments, the first viewing request is used to request to view the locations of the plurality of first terminals inside a first target area at the target moment, and the searching unit includes: a first obtaining module, configured to obtain locations of the plurality of first terminals corresponding to the target moment from the location sequence, to obtain the first location information; a sifting module, configured to sift out locations of the plurality of first terminals inside the first target area from the first location information, to obtain second location information; and a first generation module, configured to generate the indication information according to the second location information.

In one embodiment, when the target terminal sends the first viewing request to the server to request to view locations of the plurality of first terminals, an area that is requested to view is limited. That is, the first viewing request sent by the target terminal is used to request to view locations of the plurality of first terminals inside the first target area at the target moment. The first target area is an area that the target terminal requests to view. The server obtains, according to a first target moment in the first viewing request, locations of the plurality of first terminals corresponding to the target moment in the location sequence, to obtain first location information, and further sifts the first location information according to the first target area, to obtain second location information. Locations of the plurality of first terminals in the second location information are estimated locations of the plurality of first terminals in the first target area at the target moment.

As shown in FIG. 5, the target terminal requests to view a location of a shared bicycle inside the first target area at the target moment one minute. The server calculates, according to the obtained motion information of all shared bicycles at the current moment, locations of all the shared bicycles at a moment of one minute in the future, and stores the locations in the location sequence. After receiving a viewing request from the target terminal, the server searches the location sequence for the locations of all the shared bicycles corresponding to the moment of one minute in the future, sifts out locations of shared bicycles located inside the first target area, and sends the locations to the target terminal, to display the locations inside the first target area in a map of the target terminal. FIG. 6 shows an estimated location of a shared bicycle inside the first target area at a moment 5 minutes in the future.

In some embodiments, the apparatus further includes: a second receiving unit, configured to receive a second viewing request from the target terminal after a location sequence of the plurality of first terminals is generated according to the motion information, the second viewing request being set to request to view traffic condition information of a second target area at the target moment; a second obtaining unit, configured to obtain locations of the plurality of first terminals corresponding to the target moment from the location sequence according to the second viewing request, to obtain third location information; a counting unit, configured to count a quantity of the first terminals inside the second target area according to the third location information; a determining unit, configured to determine the traffic condition information according to the quantity of the first terminals; and a second sending unit, configured to send the traffic condition information to the target terminal.

In some embodiments, the server may determine locations of the plurality of first terminals at a future moment according to the motion information of the plurality of first terminals, and further, determine traffic condition information at the future moment. Specifically, the target terminal may send a second viewing request to the server, to request to view traffic condition information inside a second target area. For example, a user may send a second viewing request to the server, to learn about whether a traffic condition inside a second target area is congested in 10 minutes. The server searches, according to a target moment in the second viewing request, the location sequence for location information of the plurality of first terminals corresponding to the target moment, to third location information, and then, count a quantity of the plurality of first terminals inside the second target area according to the third location information.

In some embodiments, the server determines, according to size of the second target area, a threshold for determining traffic condition information, and determines traffic condition information of the second target area according to a relationship between the quantity of the plurality of first terminals inside the second target area and the threshold. For example, the second target area includes a road section that is 100 meters long, and the server sets two thresholds, 20 and 50, in total, to determine a traffic condition of the road section. Specifically, when fewer than 20 vehicles are traveling on the road section, the traffic condition of the road section is smooth; when a quantity of vehicles traveling on the road section is greater than 20 but is fewer than 50, the traffic condition of the road section is slow; and when a quantity of vehicles traveling on the road section is greater than 50, the traffic condition of the road section is congested. The server obtains locations of the plurality of first terminals at the target moment according to the second viewing request, further counts a quantity of the plurality of first terminals inside a second area, determines traffic condition information of the second area at the target moment by determining the quantity of the plurality of first terminals inside the second area and a specified threshold, and sends the traffic condition information to the target terminal.

In some embodiments, different traffic condition information may be directly displayed on the target terminal in a manner such as a color. For example, when the traffic condition is smooth, a corresponding road section in the map of the target terminal is displayed in green, when the traffic condition is slow, the corresponding road section in the map of the target terminal is displayed in yellow, and when the traffic condition is congested, the corresponding road section in the map of the target terminal is displayed in red.

As shown in FIG. 7, the target terminal requests the server for viewing traffic condition information inside the second target area at a moment one minute in the future. The server determines that traffic condition information of the road section is slow according to a quantity of vehicles traveling on the target road section inside the second target area at the moment one minute in the future, and sends the traffic condition information to the target terminal, to enable the target terminal to identify the road section in the map to be slow.

As shown in FIG. 8, the target terminal requests the server for viewing traffic condition information inside the second target area at a moment five minutes in the future. If the server determines that traffic condition information of the road section is congested according to a quantity of vehicles traveling on the target road section inside the second target area at the moment five minutes in the future, the server sends the traffic condition information to the target terminal, and the target terminal identifies, according to the received traffic condition information, the road section inside the second target area to be congested.

In some embodiments, the first obtaining unit includes a second obtaining module, configured to obtain current locations, current moving speeds, and moving paths of the plurality of first terminals; and the first generating unit includes a second generation module, configured to generate the location sequence according to the current locations, the current moving speeds, and the moving paths of the plurality of first terminals.

In one embodiment, the motion information of a plurality of first terminals obtained by the server includes: current locations, current moving speeds, and moving paths of the plurality of first terminals. The server calculates locations of the plurality of first terminals at a future moment of the current moment according to the current locations, the current moving speeds, and the moving paths of the plurality of first terminals, and generates the location sequence. When the server calculates the locations of the plurality of first terminals at the future moment according to the current locations, the current moving speeds, and the moving paths of the plurality of first terminals, the current moving speeds of the first terminals are moving speeds of the first terminals by default, and current planned moving paths do not change until the server obtains locations, moving speeds, and moving paths of the first terminals at a next moment again, and calculates locations of the first terminals at a future moment of the next moment according to the newly obtained locations, moving speeds, and moving paths.

In some embodiments, when the server calculates locations of the first terminals at a future moment according to current motion information, or may correct the current speeds of the first terminals according to traffic condition information on the moving paths of the first terminal at the current moment, and calculates locations of the first terminals at a future moment according to the corrected speeds. For example, if the server obtains that a current speed of a first terminal is 60 meters/second, and learns that the first terminal is about to enter a slow-moving road section having a highest speed of 30 meters/second according to a current moving path of the first terminal and traffic condition information at a current moment, when the server calculates a location of the first terminal at a moment five minutes in the future according to current motion information of the first terminal, the server needs to correct a current speed of the first terminal with reference to a traffic condition. In some embodiments, a moving distance of the first terminal is calculated according to 30 meters/second in a slow-moving road section, and a moving distance of the first terminal is calculated according to 60 meters/second in a non-slow-moving road section.

In some embodiments, the second generation module includes: a determining sub-module, configured to determine a location of each first terminal at each moment in a target time sequence according to the current location, the current moving speed, and the moving path of the first terminal, the target time sequence including the one or more moments that are after the current moment; and a sequence module, configured to use the target time sequence having the locations of the plurality of first terminals as the location sequence, each moment in the location sequence corresponding to locations of the plurality of first terminals.

In one embodiment, the server uses a future moment of the current moment including one or more moments as a target time sequence, calculates a location of each first terminal at each moment in the target time sequence according to a location, a moving speed, and a moving path of the first terminal at the current moment, and then, uses the target time sequence and locations of the foregoing plurality of first terminals corresponding to the target time sequence as a location sequence generated at the current moment. As shown in FIG. 9, the target time sequence includes a total of four moments, that is, one minute in the future, three minutes in the future, five minutes in the future, and ten minutes in the future, and each moment corresponds to location data of a plurality of first terminals at the moment.

Figure 12:
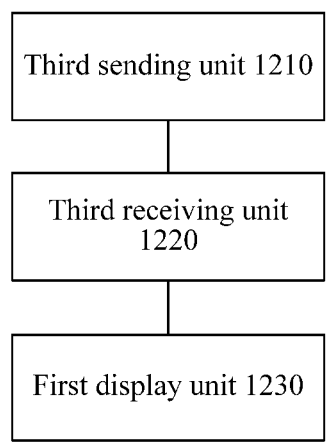
FIG. 12 is a schematic diagram of another location information processing apparatus according to an embodiment of the present disclosure.

According to the embodiments of the present disclosure, an embodiment of another location information processing apparatus is provided. FIG. 12 is a schematic diagram of a location information processing apparatus according to an embodiment of the present disclosure. As shown in FIG. 11, the apparatus may include: a third sending unit 1210, a third receiving unit 1220, and a first display unit 1230.

It should be noted that the third sending unit 1210 in this embodiment can be configured to perform step S1002 in the foregoing embodiment of this application, the third receiving unit 1220 in this embodiment can be configured to perform step S1004 in the foregoing embodiment of this application, and the first display unit 1230 in this embodiment can be configured to perform step S1006 in the foregoing embodiment of this application.

It should be noted herein that implemented examples and application scenarios of the foregoing units are the same those of the corresponding steps, but are not limited to the content disclosed by the foregoing embodiment. It should be noted that the foregoing units can operate as a part of the apparatus in a hardware environment as shown in FIG. 3, and can be implemented through software or hardware.

In some embodiments, the apparatus further includes: a presentation unit, configured to: before the first viewing request is sent to the server, present a target time sequence, the target time sequence including the one or more moments that are after the current moments; a fourth receiving unit, configured to receive indication information, the indication information being set to indicate one of the moments that is selected from the target time sequence as the target moment; and a second generating unit, configured to generate the first viewing request according to the indication information.

In some embodiments, the target terminal presents a target time sequence in a display interface of the map. The target time sequence includes a future moment of the current moment, and the future moment corresponds to one or more moments in the location sequence generated by the server. In some embodiments, the presented target time sequence may be in various forms such as a time axis form and a time option form, and the user may send indication information to the target terminal by sliding a time axis or selecting a time option, to select one moment from the target time sequence as the target moment in the first viewing request. The target terminal generates the first viewing request according to the received indication information, and sends it to the server.

In some embodiments, the first viewing request further includes a first target area, the first viewing request being used to request to view locations of the plurality of first terminals in the first target area at the target moment; the third receiving unit includes: a receiving module, configured to receive indication information sent by the server, the indication information being used to indicate the locations of the plurality of first terminals inside the first target area at the target moment; and the first display unit includes a display module, configured to display the estimated locations of the plurality of first terminals inside the first target area at the target moment.

In some embodiments, an area viewed by the target terminal is a limited area. Therefore, the first viewing request generated on the target terminal further includes the first target area. The first viewing request is used to request to view locations of the plurality of first terminals inside the first target area at the target moment. The server generates the indication information according to the first viewing request, and sends the indication information to the target terminal, to indicate, to the target terminal, the locations of the plurality of first terminals inside the first target area the target moment. The target terminal displays the estimated locations of the plurality of first terminals inside the first target area the target moment in the map according to the received indication information.

In some embodiments, the apparatus further includes a fourth sending unit, configured to: before a first viewing request is sent to a server, or after a first viewing request is sent to a server, send a second viewing request to the server, the second viewing request being used to request to view traffic condition information of a second target area at the target moment, to enable the server to determine the traffic condition information according to a quantity of the first terminals inside the second target area at the target moment, the quantity of the first terminals inside the second target area being counted by the server according to third location information, the third location information being the locations of the plurality of first terminals corresponding to the target moment obtained by the server from the location sequence according to the second viewing request; a fifth receiving unit, configured to receive the traffic condition information sent by the server; and a second display unit, configured to display the estimated traffic condition information of the second target area.

In an optional the embodiment, the target terminal may further view the traffic condition information inside the second target area at the target moment in the future by sending the second viewing request to the server. Specifically, the target terminal sends second viewing information to the server. The second viewing information includes the second target area and the target moment, and the second viewing information is used to request the server to view the traffic condition information inside the second target area at the target moment. The server searches, according to a target moment in the second viewing request, the location sequence for location information of the plurality of first terminals corresponding to the target moment, to third location information, and then, count a quantity of the first terminals inside the second target area according to the third location information.

In some embodiments, the server determines, according to size of the second target area, a threshold for determining traffic condition information, and determines traffic condition information of the second target area according to a relationship between the quantity of the first terminals inside the second target area and the threshold. For example, a user may send a second viewing request to the server, to learn about whether a traffic condition inside a second target area is congested in 10 minutes. The second target area includes a road section that is 100 meters long, and the server sets two thresholds, 20 and 50, in total, to determine a traffic condition of the road section. When fewer than 20 vehicles are traveling on the road section, the traffic condition of the road section is smooth; when a quantity of vehicles traveling on the road section is greater than 20 but is fewer than 50, the traffic condition of the road section is slow; and when a quantity of vehicles traveling on the road section is greater than 50, the traffic condition of the road section is congested. The server obtains locations of the plurality of first terminals at the target moment according to the second viewing request, further counts a quantity of the first terminals inside a second area, determines traffic condition information of the second area at the target moment by determining the quantity of the first terminals inside the second area and a specified threshold, and sends the traffic condition information to the target terminal.

It should be noted herein that implemented examples and application scenarios of the foregoing modules are the same those of the corresponding steps, but are not limited to the content disclosed by the foregoing embodiment. It should be noted that the foregoing modules can operate as a part of the apparatus in a hardware environment as shown in FIG. 3, and can be implemented through software or hardware. The hardware environment includes a network environment.

According to the embodiments of the present disclosure, an electronic apparatus configured to perform the foregoing location information processing method is further provided.

Figure 13:
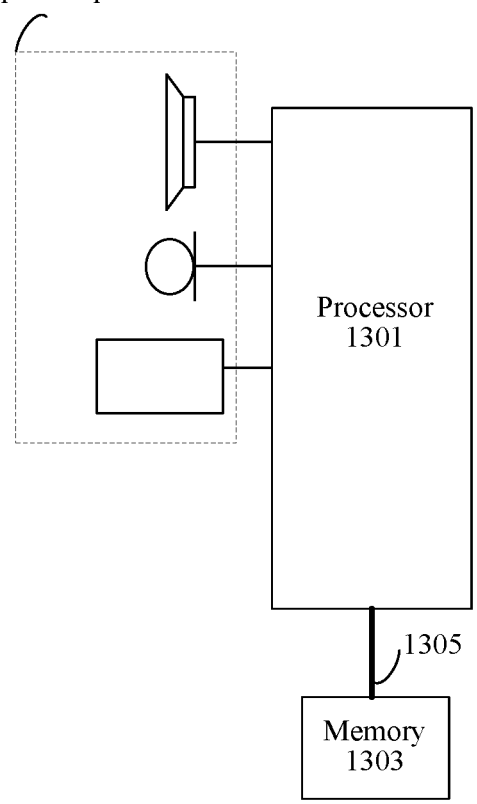
FIG. 13 is a structural block diagram of an electronic apparatus according to an embodiment of the present disclosure.

FIG. 13 is a structural block diagram of an electronic apparatus according to an embodiment of the present disclosure. As shown in FIG. 13, the electronic apparatus may include: one or more (only one is shown in the figure) processors 1301, a memory 1303, and a transmission apparatus 1305 (for example, the sending apparatus in the foregoing embodiment). As shown in FIG. 13, the terminal may further include an input/output device 1307.

The memory 1303 may be configured to store a software program and a module, for example, a program instruction/module corresponding to a location information processing method and apparatus in embodiments of the present disclosure, and the processor 1301 performs various functional applications and data processing by running a software program and a module stored in the memory 1303, that is, implementing the foregoing location information processing method. The memory 1303 may include a high-speed random memory, and may alternatively include a nonvolatile memory such as one or more magnetic storage devices, a flash memory, or another nonvolatile solid-state memory. In some instances, the memory 1303 may further include memories remotely disposed relative to the processor 1301, and these remote memories may be connected to the terminal through a network. Instances of the network include, but are not limited to, the Internet, an intranet, a local area network, a mobile communications network, and a combination thereof The foregoing transmission apparatus 1305 is configured to receive or send data through a network or may be configured for data transmission between the processor and the memory. Specific examples of the foregoing network may include a wired network and a wireless network. In an example, the transmission apparatus 1305 includes a network interface controller (NIC) that may be connected to another network device and a router by using a network cable, thereby communicating with the Internet or a local area network. In an example, the transmission apparatus 1305 is a radio frequency (RF) module that is configured to communicate with the Internet in a wireless manner.

Specifically, the memory 1303 is configured to store an application program.

The processor 1301 may invoke, through the transmission apparatus 1305, an application program stored in the memory 1303 to perform the following steps: obtaining locations of the plurality of first terminals corresponding to the target moment from the location sequence, to obtain the first location information; sifting out locations of the plurality of first terminals inside the first target area from the first location information, to obtain second location information; and generating the indication information according to the second location information.

The processor 1301 is further configured to perform the following steps: receiving a second viewing request from the target terminal, the second viewing request being used to request to view traffic condition information of a second target area at the target moment; obtaining locations of the plurality of first terminals corresponding to the target moment from the location sequence according to the second viewing request, to obtain third location information; counting the first terminals inside the second target area according to the third location information; determining the traffic condition information according to the quantity of the first terminals; and sending the traffic condition information to the target terminal.

The processor 1301 is further configured to perform the following steps: the obtaining motion information of a plurality of first terminals at a current moment includes: obtaining current locations, current moving speeds, and moving paths of the plurality of first terminals; and the generating a location sequence of the plurality of first terminals according to the motion information includes: generating the location sequence according to the current locations, the current moving speeds, and the moving paths of the plurality of first terminals.

The processor 1301 is further configured to perform the following steps: determining a location of each first terminal at each moment in a target time sequence according to the current location, the current moving speed, and the moving path of the first terminal, the target time sequence including the one or more moments that are after the current moment; and using the target time sequence having the locations of the plurality of first terminals as the location sequence, each moment in the location sequence corresponding to locations of the plurality of first terminals.

According to the embodiments of the present disclosure, a solution of a server configured to perform the foregoing location information processing method is further provided. Locations of the plurality of first terminals at one or more moments in the future are generated according to the motion information of the plurality of first terminals at the current moment, and when the viewing request is received from the target terminal, information used to indicate locations of the plurality of first terminals at a future moment is sent to the target terminal according to the viewing request, to display the locations of the plurality of first terminals at the future moment on the target terminal, to achieve a technical effect of displaying location information at a future moment in a map, thereby resolving a technical problem that location information at a future moment cannot be displayed on in a map.

In some embodiments, for a specific example in this embodiment, refer to the examples described in the foregoing embodiments, and details are not described herein again in this embodiment.

It may be understood by a person of ordinary skill in the art that the structure shown in FIG. 13 is merely illustrative instead of limiting a structure of the foregoing electronic apparatus. For example, the electronic apparatus may alternatively include more or less components (such as a network interface and a display apparatus) than those shown in FIG. 13, or has a configuration different from that shown in FIG. 13.

A person of ordinary skill in the art may understand that all or a part of the steps of the methods of the foregoing embodiments may be implemented by a program instructing relevant hardware of a server device. The program may be stored in a computer readable storage medium. The storage medium may be a flash disk, a read-only memory (ROM), a random access memory (RAM), a magnetic disk, or a compact disc.

This embodiment of this application further provides a storage medium. In some embodiments, in this embodiment, the foregoing storage medium stores a computer program. The computer program is configured to perform, during running, the location information processing method.

In some embodiments, in this embodiment, the foregoing storage medium may be located in at least one of a plurality of network devices in the network shown in the foregoing embodiment.

In some embodiments, in this embodiment, the storage medium is set to store program code used for performing the following steps:

S1: Obtain motion information of a plurality of first terminals at a current moment.

S2: Generate a location sequence of the plurality of first terminals according to the motion information, the location sequence being used to represent correspondences between locations of the plurality of first terminals and one or more moments that are after the current moment.

S3: Receive a first viewing request sent by a target terminal, the first viewing request being used to request to view the locations of the plurality of first terminals at a target moment, the target moment being any one of the one or more moments.

S4: Search the location sequence for the locations of the plurality of first terminals at the target moment according to the first viewing request.

S5: Sending indication information to the target terminal, the indication information being used to indicate the estimated locations of the plurality of first terminals at the target moment.

In some embodiments, the storage medium is further configured to store program code used for performing the following steps: obtaining locations of the plurality of first terminals corresponding to the target moment from the location sequence, to obtain the first location information; sifting out locations of the plurality of first terminals inside the first target area from the first location information, to obtain second location information; and generating the indication information according to the second location information.

In some embodiments, the storage medium is further configured to store program code used for performing the following steps: receiving a second viewing request from the target terminal, the second viewing request being used to request to view traffic condition information of a second target area at the target moment; obtaining locations of the plurality of first terminals corresponding to the target moment from the location sequence according to the second viewing request, to obtain third location information; counting the first terminals inside the second target area according to the third location information; determining the traffic condition information according to the quantity of the first terminals; and sending the traffic condition information to the target terminal.

In some embodiments, the storage medium is further configured to store program code used for performing the following steps: the obtaining motion information of a plurality of first terminals at a current moment includes: obtaining current locations, current moving speeds, and moving paths of the plurality of first terminals; and the generating a location sequence of the plurality of first terminals according to the motion information includes: generating the location sequence according to the current locations, the current moving speeds, and the moving paths of the plurality of first terminals.

In some embodiments, the storage medium is further configured to store program code used for performing the following steps: determining a location of each first terminal at each moment in a target time sequence according to the current location, the current moving speed, and the moving path of the first terminal, the target time sequence including the one or more moments that are after the current moment; and using the target time sequence having the locations of the plurality of first terminals as the location sequence, each moment in the location sequence corresponding to locations of the plurality of first terminals.

In some embodiments, for a specific example in this embodiment, refer to the examples described in the foregoing embodiments, and details are not described herein again in this embodiment.

In some embodiments, in this embodiment, the foregoing storage medium may include but is not limited to: any medium that can store program code, such as a USB flash drive, a read-only memory (ROM), a random access memory (RAM), a removable hard disk, a magnetic disk, or a compact disc.

When the integrated unit or module in the foregoing embodiment is implemented in a form of a software functional module and sold or used as an independent product, the integrated unit or module may be stored in the foregoing computer-readable storage medium. Based on such an understanding, the technical solutions of the embodiments of the present disclosure essentially, or the part contributing to the prior art, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the functions of the unit or the module described in the embodiments of the present disclosure.

In the foregoing embodiments of the present disclosure, descriptions of the embodiments have different emphases, and as for parts that are not described in detail in one embodiment, reference can be made to the relevant description of the other embodiments.

In the several embodiments provided in the present application, it should be understood that the disclosed client may be implemented in other manners. The described apparatus embodiments are merely exemplary. For example, the unit division or module division is merely logical function division and may be other division during actual implementation. For example, multiple units, multiple modules, or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units/modules described as separate parts may or may not be physically separate, and parts displayed as units/modules may or may not be physical units/modules, may be located in one position, or may be distributed on a plurality of network units/modules. Some or all of the units/modules may be selected according to actual needs to achieve the objectives of the solutions of the embodiments.

In addition, functional units or modules in the embodiments of the present disclosure may be integrated into one processing unit or module, or each of the units or modules may exist alone physically, or two or more units are integrated into one unit or module. The integrated unit may be implemented in a form of hardware, or may be implemented in a form of a software functional unit or software functional module.

The above descriptions are merely preferred embodiments of the present disclosure, and it should be noted that, a person of ordinary skill in the art may make various improvements and refinements without departing from the spirit of the present disclosure. All such modifications and refinements should also be intended to be covered by the present disclosure.

What is claimed is:

1. A location information processing method, the location information processing method being performed by a server and comprising:

obtaining motion information of a plurality of first terminals at a current moment;

generating a location sequence of the plurality of first terminals according to the motion information, the location sequence indicating correspondence between locations of the plurality of first terminals and one or more future moments;

receiving a first viewing request from a target terminal, the first viewing request requesting to view locations of the plurality of first terminals at a first target moment, the first target moment being one of the future moments;

searching the location sequence for the locations of the plurality of first terminals at the first target moment inside of a first target area according to the first viewing request;

sending indication information to the target terminal, the indication information indicating the locations of the plurality of first terminals at the first target moment;

receiving a second viewing request from the target terminal, the second viewing request requesting to view traffic condition information of a second target area at the first target moment and obtaining locations of the plurality of first terminals at the first target moment from the location sequence according to the second viewing request, to obtain location information.

2. The method according to claim 1, wherein the location information is third location information, and the method further comprising:
obtaining first location information based on locations of the plurality of first terminals corresponding to the first target moment from the location sequence;
sifting out locations of the plurality of first terminals inside the first target area from the first location information, to obtain second location information; and
generating the indication information according to the second location information.

3. The method according to claim 1, further comprising:
counting the first terminals inside the second target area according to the location information;
determining the traffic condition information according to a quantity of the first terminals; and
sending the traffic condition information to the target terminal.

4. The method according to claim 1, further comprising:
obtaining current locations, current moving speeds, and moving paths of the plurality of first terminals; and
generating the location sequence according to the current locations, the current moving speeds, and the moving paths of the plurality of first terminals.

5. The method according to claim 4, further comprising:
determining a location of each first terminal at each moment in a target time sequence according to the current location, the current moving speed, and the moving path of the first terminal.

6. The method according to claim 5, further comprising:
identifying the target time sequence having the locations of the plurality of first terminals as the location sequence, each moment in the location sequence corresponding to locations of the plurality of first terminals.

7. A location information processing method, the location information processing method being performed by a terminal and comprising:
sending a first viewing request to a server, the first viewing request requesting to view locations of a plurality of first terminals at a first target moment, the server searching a location sequence for the locations of the plurality of first terminals inside of a first target area at the first target moment according to the first viewing request;
receiving indication information from the server according to the first viewing request, the indication information indicating the locations of the plurality of first terminals inside of the first target area at the first target moment;
displaying the locations of the plurality of first terminals at the first target moment;
sending a second viewing request to the server, the second viewing request requesting to view traffic condition information of a second target area at the first target moment and
obtaining locations of the plurality of first terminals at the first target moment from the location sequence according to the second viewing request, to obtain location information.

8. The method according to claim 7, wherein the location sequence is generated by the server according to motion information of the plurality of first terminals at the current moment and indicates correspondences between locations of the plurality of first terminals and one or more future moments, and the first target moment is any one of the future one or more moments.

9. The method according to claim 8, further comprising:
receiving second indication information, the second indication information indicating one of the future moments that is selected from a target time sequence as the first target moment; and
generating the first viewing request according to the second indication information.

10. The method according to claim 7, wherein the server determines the traffic condition information according to a quantity of the first terminals inside the second target area at the first target moment, the quantity of the first terminals inside the second target area being counted by the server according to the location information.

11. A location information processing apparatus, comprising: a memory and a processor coupled to the memory, the processor being configured to:
obtain motion information of a plurality of first terminals at a current moment;
generate a location sequence of the plurality of first terminals according to the motion information, the location sequence representing correspondences between locations of the plurality of first terminals inside of a first target area and one or more future moments;
receive a first viewing request from a target terminal, the first viewing request requesting to view the locations of the plurality of first terminals at a first target moment, the target moment being any one of the one or more future moments;
search the location sequence for locations of the plurality of first terminals at the first target moment according to the first viewing request;
send indication information to the target terminal, the indication information indicating the locations of the plurality of first terminals at the first target moment;
send a second viewing request to the server, the second viewing request requesting to view traffic condition information of a second target area at the first target moment and
obtain locations of the plurality of first terminals at the first target moment from the location sequence according to the second viewing request, to obtain location information.

12. The apparatus according to claim 11, wherein the location information is third location information, and wherein the first viewing request requests to view the locations of the plurality of first terminals inside a first target area at the target moment, and the processor is further configured to:
obtain locations of the plurality of first terminals corresponding to the first target moment from the location sequence, to obtain the first location information;
sift out locations of the plurality of first terminals inside the first target area from the first location information, to obtain second location information; and
generate the indication information according to the second location information.

13. The apparatus according to claim 11, wherein the processor is further configured to:
count first terminals inside the second target area according to the third location information; and
determine the traffic condition information according to a quantity of the first terminals.

14. The apparatus according to claim 11, wherein the processor is further configured to obtain current locations, current moving speeds, and moving paths of the plurality of first terminals.

15. The apparatus according to claim 11, wherein the processor is further configured to:
  obtain current locations, current moving speeds, and moving paths of the plurality of first terminals; and
  generate the location sequence according to the current locations, the current moving speeds, and the moving paths of the plurality of first terminals.

16. A non-transitory computer-readable storage medium storing computer program instructions executable by a process to perform:
  obtaining motion information of a plurality of first terminals at a current moment;
  generating a location sequence of the plurality of first terminals according to the motion information, the location sequence indicating correspondence between locations of the plurality of first terminals and one or more future moments;
  receiving a first viewing request from a target terminal, the first viewing request requesting to view locations of the plurality of first terminals at a first target moment, the first target moment being one of the future moments;
  searching the location sequence for the locations of the plurality of first terminals at the first target moment inside of a first target area according to the first viewing request;
  sending indication information to the target terminal, the indication information indicating the locations of the plurality of first terminals at the first target moment;
  receiving a second viewing request from the target terminal, the second viewing request requesting to view traffic condition information of a second target area at the first target moment; and
  obtaining locations of the plurality of first terminals at the first target moment from the location sequence according to the second viewing request, to obtain location information.

17. The non-transitory computer-readable storage medium according to claim 16, wherein the location information is third location information, and wherein the computer program instructions are executable by the process to further perform:
  obtaining first location information based on locations of the plurality of first terminals corresponding to the first target moment from the location sequence;
  sifting out locations of the plurality of first terminals inside the first target area from the first location information, to obtain second location information; and
  generating the indication information according to the second location information.

18. The non-transitory computer-readable storage medium according to claim 16, wherein the computer program instructions are executable by the process to further perform:
  counting the first terminals inside the second target area according to the location information;
  determining the traffic condition information according to a quantity of the first terminals; and
  sending the traffic condition information to the target terminal.

19. The non-transitory computer-readable storage medium according to claim 16, wherein the computer program instructions are executable by the process to further perform:
  obtaining current locations, current moving speeds, and moving paths of the plurality of first terminals; and
  generating the location sequence according to the current locations, the current moving speeds, and the moving paths of the plurality of first terminals.

20. The non-transitory computer-readable storage medium according to claim 19, wherein the computer program instructions are executable by the process to further perform:
  determining a location of each first terminal at each moment in a target time sequence according to the current location, the current moving speed, and the moving path of the first terminal.

21. The non-transitory computer-readable storage medium according to claim 20, wherein the computer program instructions are executable by the process to further perform:
  identifying the target time sequence having the locations of the plurality of first terminals as the location sequence, each moment in the location sequence corresponding to locations of the plurality of first terminals.

* * * * *